(12) United States Patent  (10) Patent No.: US 8,220,126 B1
Yunk et al.  (45) Date of Patent: Jul. 17, 2012

(54) BARBED METAL INSERT OVERMOLDING USING CROSSLINKED POLYMERS

(75) Inventors: Robert Yunk, Mantua, OH (US); Earl Christian, Jr., Warren, OH (US)

(73) Assignees: Mercury Plastics, Inc., Middlefield, OH (US); Masco Corporation, Taylor, MI (US)

( * ) Notice: Subject to any disclaimer, the term of this patent is extended or adjusted under 35 U.S.C. 154(b) by 491 days.

(21) Appl. No.: 12/618,296

(22) Filed: Nov. 13, 2009

(51) Int. Cl.
*B23P 11/02* (2006.01)
*B29C 71/00* (2006.01)
*B29C 45/14* (2006.01)
*F16L 47/00* (2006.01)

(52) U.S. Cl. ......... 29/447; 29/527.1; 264/236; 264/279; 285/293.1; 285/294.1

(58) Field of Classification Search .................. 285/242, 285/293.1, 294.1; 264/236, 279; 29/527.1, 29/527.2, 447
See application file for complete search history.

(56) References Cited

U.S. PATENT DOCUMENTS

| 4,664,423 A | 5/1987 | Rowley |
| 4,740,017 A | 4/1988 | Grabowski |
| 5,033,775 A | 7/1991 | Matte et al. |
| 5,605,355 A | 2/1997 | Andre |
| 5,895,695 A * | 4/1999 | Rowley .................. 428/36.9 |
| 6,497,836 B2 | 12/2002 | Krause et al. |
| 6,732,543 B2 | 5/2004 | Jenkins, Jr. et al. |
| 8,146,955 B2 * | 4/2012 | Thomas et al. ........... 285/293.1 |
| 2002/0129861 A1 | 9/2002 | Holdenried |
| 2006/0152003 A1 | 7/2006 | Slunick et al. |
| 2006/0170134 A1* | 8/2006 | Rowley et al. ................ 264/265 |
| 2007/0051418 A1 | 3/2007 | Rowles et al. |
| 2009/0126820 A1* | 5/2009 | Thomas et al. ............... 138/121 |

OTHER PUBLICATIONS

Lendlein, Andreas and Kelch, Steffen, "Shape-Memory Effect, From Temporary shape . . . to permanent shape." Angew Chem. Int. Ed. 2002, 41 2034-2057, Wiley-VCH GmbH, Weinheim, Germany 2002.
U.S. Appl. No. 12/618,332, filed Nov. 13, 2009.
U.S. Appl. No. 12/618,158, filed Nov. 13, 2009.
U.S. Appl. No. 12/618,089, filed Nov. 13, 2009.
U.S. Appl. No. 12/618,226, filed Nov. 13, 2006.

* cited by examiner

*Primary Examiner* — Jermie Cozart
(74) *Attorney, Agent, or Firm* — Hahn Loeser & Parks, LLP (57) ABSTRACT

The invention described herein relates to method by which a leak-proof connection may be made to a refrigeration device using shape memory characteristics of crosslinking and overmolding to affect the leak-proof connection.

6 Claims, 6 Drawing Sheets

BARBED METAL INSERT OVERMOLDING USING CROSSLINKED POLYMERS

TECHNICAL FIELD

The invention relates generally to a leak-proof method for securing a fitting into a crosslinked polymeric tube, coupled with overmolding.

BACKGROUND OF THE INVENTION

Most refrigerators sold today have at least automatic ice makers and chilled water dispensers. In order to achieve the requisite water flow into these devices, it is necessary to connect to a water supply line. This necessarily entails a connection between the water system in a home or apartment or other building with the internal water conduits within the refrigeration device. Typically, this has entailed the use of hose clamps or other connectors when the internal water conduits are made of polymeric tubes. However, hose clamps are labor-intensive to install and prone to leaks if not fastened tightly enough about the periphery of the polymeric tube.

There is a need for a better connection between an inserted metallic connector and the polymeric tube into which the connector is inserted without the need to resort to the use of hose clamps or other circumferential fastening devices, such devices additionally useful as risers or automotive tubes.

SUMMARY OF THE INVENTION

In accordance with one aspect of the invention, there is provided an overmolding method in combination with crosslinked extruded polymeric tubing and insertable connectors which remove the need for hose clamps for circumferential compressive attachment.

In one embodiment of the invention, the process involves a process for securing a house water line to a water distribution system within a refrigeration device comprising the steps of: crosslinking at least a portion of a tube to set the permanent internal diameter of said tube and shape memory characteristics in that portion; inserting a shaft of a connector into the tube, an I.D. of the tube being equal to or smaller than an O.D. of the shaft; and applying an external stimulus (e.g., a temperature in excess of the transition temperature $T_{trans}$, or an electric field, or a magnetic field, or light or a change in pH, etc.) or an internal stimulus (e.g., the passage of time) to at least the portion to contract the tube about the shaft, optionally with overmolding a polymeric attachment means onto the tube and/or connector at or adjacent one end of the tube and about at least a portion of the tube and/or connector where it is crosslinked. The step of crosslinking is generally between 20-98% crosslinking, more preferably between 40-90% crosslinking, and most preferably between 65-89% crosslinking. At least the shaft of the connector is metallic and preferably has raised retention means, e.g., laterally-extending ribs and raised barbs. The metallic portion is preferably brass or stainless steel.

In another embodiment of the invention, the process involves a process for securing a house water line to a water distribution system within a refrigeration device comprising the steps of: overmolding a polymeric attachment means onto a tube at or adjacent one end of the tube, a composition of the overmolded polymeric attachment means being at least partially chemically compatible with the tube; crosslinking at least a portion of the tube and the attachment means to set a permanent internal diameter of the tube and shape memory characteristics in that portion; inserting a shaft of a connector into the tube, an I.D. of the tube being equal to or smaller than an O.D. of the shaft; and applying an external force (e.g., a temperature in excess of the transition temperature $T_{trans}$, or an electric field, or a magnetic field, or light or a change in pH, etc.) or an internal stimulus (e.g., the passage of time) to at least the portion to contract said tube about the shaft.

In another embodiment of the invention, the process involves a process for securing a house water line to a water distribution system within a refrigeration device comprising the steps of: crosslinking at least a portion of a tube to set a permanent internal diameter of said tube and shape memory characteristics in that portion; inserting a shaft of a connector into the tube, an I.D. of the tube being equal to or smaller than an O.D. of the shaft; overmolding a polymeric attachment means onto the tube at or adjacent one end of the tube and about at least a portion of the tube which is crosslinked, the polymeric attachment means not forming a material-to-material bond with the tube; and applying an external force (e.g., a temperature in excess of the transition temperature $T_{trans}$, or an electric field, or a magnetic field, or light or a change in pH, etc.) or an internal stimulus (e.g., the passage of time) to at least the portion to contract the tube about the shaft.

These and other objects of this invention will be evident when viewed in light of the drawings, detailed description, and appended claims.

DETAILED DESCRIPTION OF THE DRAWINGS

Referring now to the drawings wherein the showings are for purposes of illustrating the preferred embodiment of the invention only and not for purposes of limiting the same, the Figures show a leak-proof method of connection with a metallic connector and a crosslinked polymeric tube.

Figure 1:
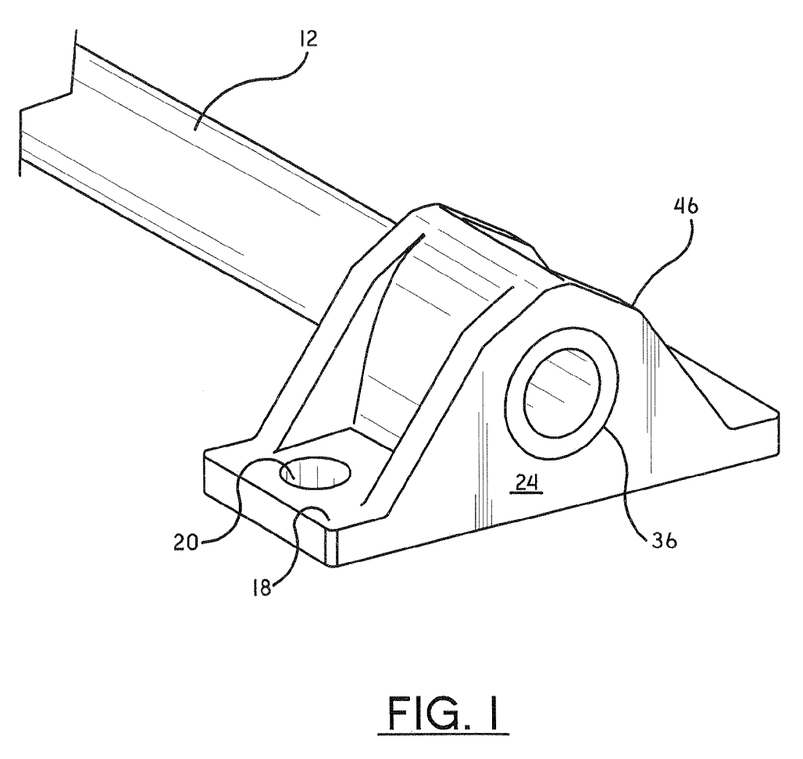
FIG. 1 is a perspective view of a tube with overmolded end section without the insertion of a metallic fitting.

FIG. 1 shows an extruded polymeric tube 12 about which is overmolded attachment piece 46 as it might be configured for installation onto a rear panel of a refrigeration device (not shown). Attachment piece 46 has a top and a bottom face 24 and a pair of opposed wings 18, at least one of which has aperture 20 extending therethrough. Each face has an aperture 36 disposed therein, the I.D. ("Internal Diameter") of the aperture closely approximates the O.D. ("Outer Diameter") of polymeric tube 12.

Figure 2A:
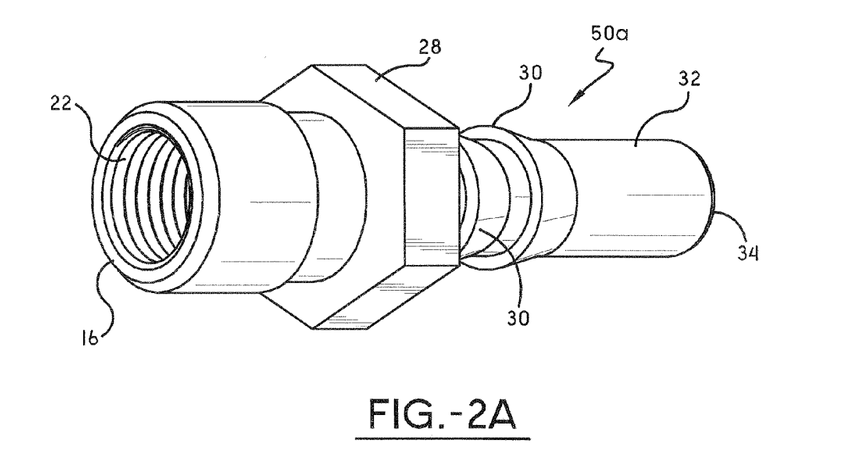
FIG. 2A is a perspective view of a barbed metallic fitting with internal threads at one end.
Figure 2B:
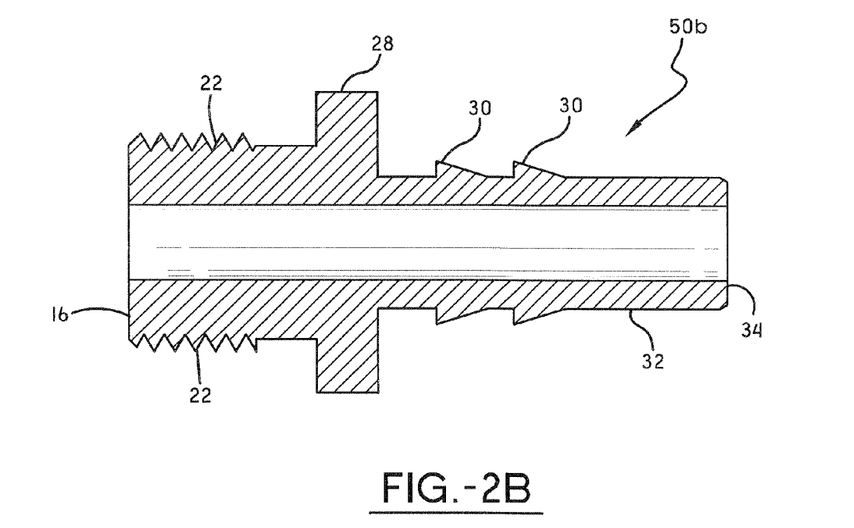
FIG. 2B is a side elevational view in cross-section of an externally threaded barbed metallic fitting.
Figure 3:
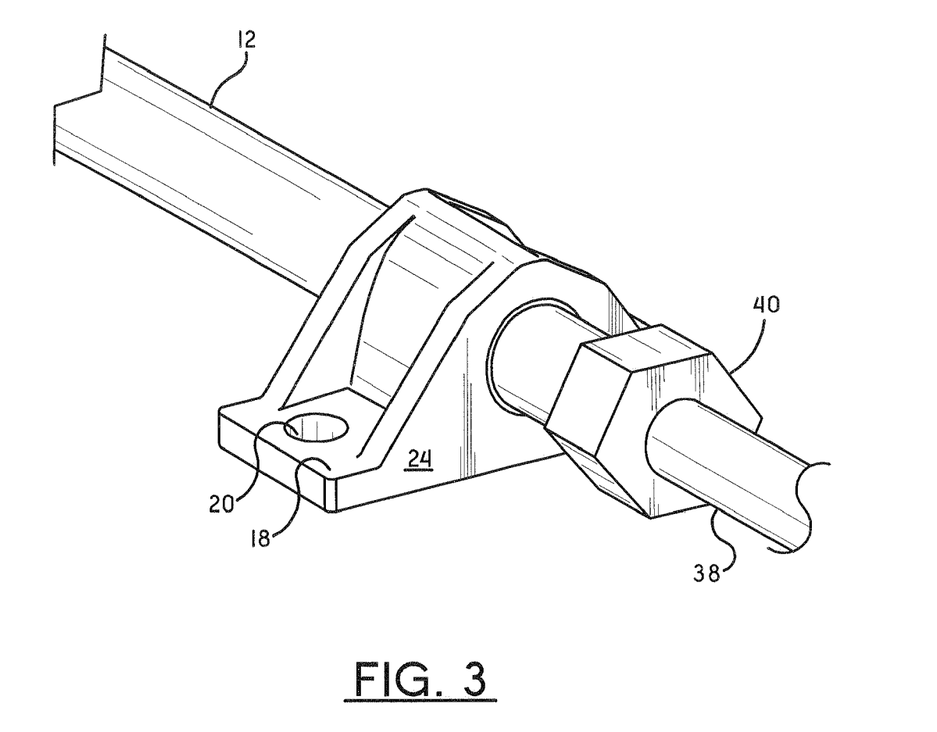
FIG. 3 is a perspective view of the tube with overmolded end section of FIG. 1 with inserted barbed metallic fitting of FIG. 2b with water supply line attached.

As better illustrated in FIGS. 2A and 2B, connector 50a or 50b is inserted into the I.D. of polymeric tube 12. Connector 50a is an internally threaded fitting illustrated in FIG. 2A while connector 50b is an externally threaded fitting illustrated in FIG. 2B. Either connector is typically made of metal, although it is possible that with the addition of various fillers (e.g., glass-filled) and/or judicious choice of polymer composition, selected polymers may be employed in the application. Either connector has a front face 16, a beveled rear face 34, plurality of threads 22, hexagonal (or other integral number of) nut faces 28, and shaft 32 with preferably at least one outwardly-extending or laterally-extending rib or barb 30.

Figure 4:
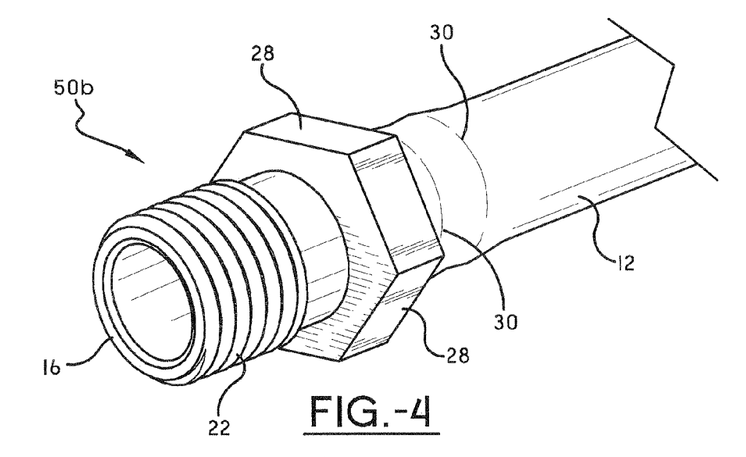
FIG. 4 is a perspective view of the barbed metallic fitting of FIG. 2b inserted into a crosslinked polymeric tube.

As illustrated in FIG. 4, upon insertion of either connector 50a (not shown) or connector 50b (illustrated), with the geometry of the O.D. of connector shaft 32 being at least equal to the I.D. of polymeric tube 12, preferably the relationship of the O.D. of connector shaft 32 is greater than the I.D. of polymeric tube 12, laterally-extending ribs 30 produce a deformation of polymeric tubing wall 12. In a most preferred embodiment, the I.D. of polymeric tubing 12 is fixed to a smaller dimension than the O.D. of shaft 32 of connector 50a or 50b by crosslinking prior to insertion of any connector. Crosslinking imparts a "memory" to the polymeric tubing's original dimensions, and upon deformation of the same, will tend to resort back to the original dimension when crosslinked upon the application of a transforming force in a manner described later in the application. Using this shape-memory feature permits leak-proof engagement of the peripheral circumferential walls of shaft 32 with associated laterally-extending ribs 30 to secure leak-proof engagement with the inner walls of polymeric tubing 12. This is particularly preferable when the polymeric walls are polyethylene, which when crosslinked become crosslinked polyethylene or "PEX."

Figure 5:
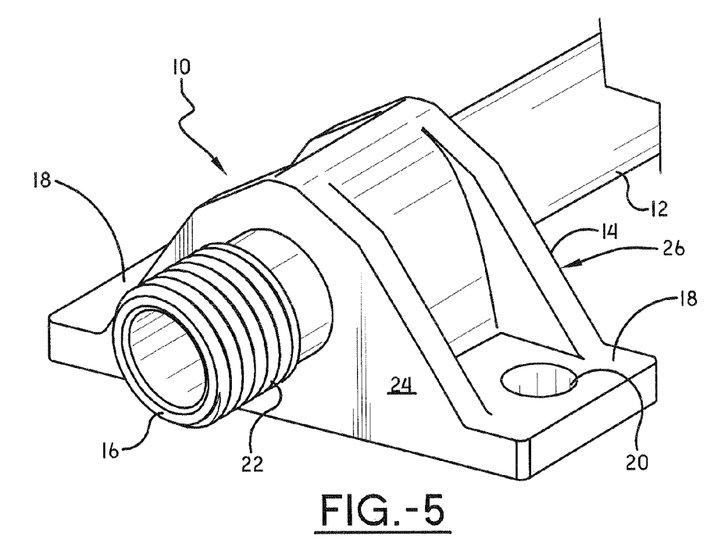
FIG. 5 is a perspective view of FIG. 4 with overmolded end section.
Figure 6A:
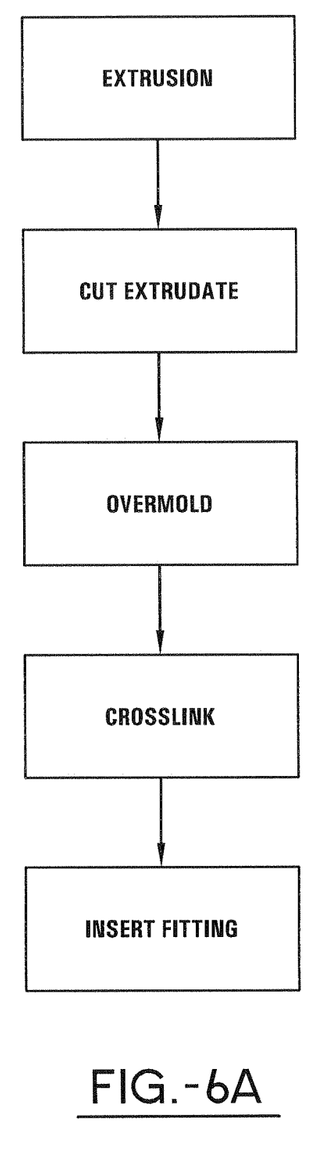
FIG. 6A is a flow diagram of a processing sequence for the invention.
Figure 6B:
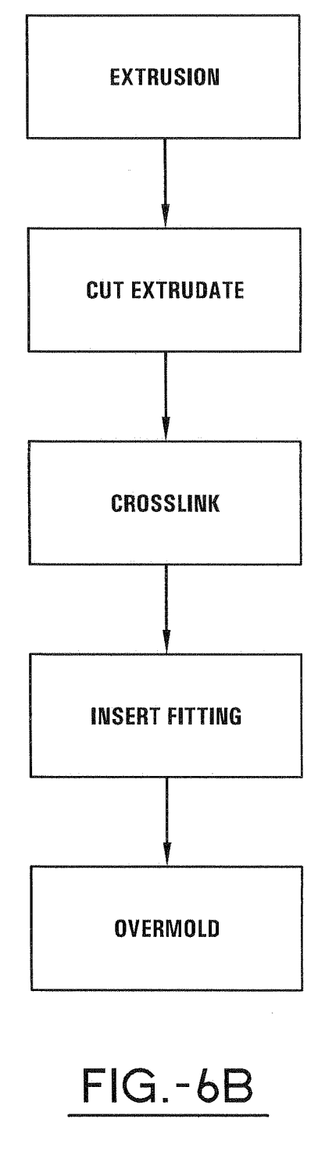
FIG. 6B is another embodiment of a flow diagram of a processing sequence for the invention.

FIG. 5 illustrates the assembled connector 10 after overmolding. The overmolding in the figure illustrates the overmold extending beyond a portion of the encapsulated faces of nut 28 in addition to extending below the encapsulated faces and upon at least a portion of polymeric tubing 12. Preferably, the overmold continues to extend over at least one retention means, e.g., laterally-extending rib 30 or raised barb. FIG. 6 illustrates a completed connector of the present invention after joining with water supply line 38 by threaded nut 40.

In processing, as illustrated in FIGS. 6A and 6B, there are two different methods which may be employed in the invention. In the series of steps illustrated in FIG. 6A, a manufacturer would extrude a polymer using traditional extrusion technologies, and cut the extruded tubing to a desired length. In this sequence, the extrudate is overmolded, followed by crosslinking and ultimately, insertion of the component fitting into the crosslinked extrudate. In the series of steps illustrated in FIG. 6B, a manufacturer would extrude a polymer and cut the extruded polymer to a desired length as described with FIG. 6A, followed by crosslinking, fitting insertion and ultimately, overmolding. It has been found that when practicing the process illustrated in FIG. 6B, that the step of overmolding not form a material-to-material bond (or if such bond forms, it is a weak bond) with the exterior of polymeric tubing 12. In this manner, the overmold acts as a separate member and allows the tube to move independently of the overmold. Common to both processes is the fact that the step of crosslinking precedes the step of insertion of the component fitting. In the process illustrated in FIG. 6B, when the step of crosslinking precedes the overmolding step, illustrative overmolding polymers would be glass-filed polypropylene, which cannot be irradiated in that polypropylene degrades under the application of an electron beam. However, polypropylene has higher heat distortion properties, and provides a better clamp in the application when compared to glass-filed polyethylene. With unfilled polyethylene, it is possible to overmold onto the tube, and then beam both the tube and overmold as one unit.

As used in this application, the term "overmold" means the process of injection molding a second polymer over a first polymer, wherein the first and second polymers may or may not be the same. In one embodiment of the invention, the composition of the overmolded polymer will be such that it will be capable of at least some melt fusion with the composition of the polymeric tube. There are several means by which this may be affected. One of the simplest procedures is to insure that at least a component of the polymeric tube and that of the overmolded polymer is the same. Alternatively, it would be possible to insure that at least a portion of the polymer composition of the polymeric tube and that of the overmolded polymer is sufficiently similar or compatible so as to permit the melt fusion or blending or alloying to occur at least in the interfacial region between the exterior of the polymeric tube and the interior region of the overmolded polymer. Another manner in which to state this would be to indicate that at least a portion of the polymer compositions of the polymeric tube and the overmolded polymer are miscible. The process of FIG. 6A illustrates the term "overmolding" with chemical compatibility. However, the process of FIG. 6B illustrates the term "overmolding" without chemical compatibility. In other words, the chemical composition of the polymers is relatively incompatible, thereby not resulting in a material-to-material bond after the injection overmolding process.

In one embodiment of this invention, polymeric tubing 12 is made from high density polyethylene which is crosslinked. PEX contains crosslinked bonds in the polymer structure changing the thermoplastic into a thermoset. Crosslinking may be accomplished during or after the extrusion of the tubing. The required degree of crosslinking, according to ASTM Standard F 876-93 is between 65-89%. There are three classifications of PEX, referred to as PEX-A, PEX-B, and PEX-C. PEX-A is made by the peroxide (Engel) method. This method performs crosslinking above the crystal melting temperature. The polymer is typically kept at high temperature and pressure for long periods of time during the extrusion process. PEX-B is formed by the silane method, also referred to as the "moisture cure" method. In this method, crosslinking is performed in a secondary post-extrusion process, producing crosslinks between a crosslinking agent. The process is accelerated with heat and moisture. The crosslinked bonds are formed through silanol condensation between two grafted vinyltrimethoxysilane units. PEX-C is produced though electron beam processing using high energy electrons to split the carbon-hydrogen bonds and facilitate crosslinking.

Crosslinking imparts shape memory properties to polymers. Shape memory materials have the ability to return from a deformed state (temporary shape) to their original (permanent shape) induced by an external stimulus (trigger), such as a temperature change. In addition to temperature, shape memory effects can be triggered by an electric field, magnetic field, light or a change in pH. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape. Afterward, the polymer is deformed and the intended temporary shape is fixed. This process is often called programming. The programming process may consist of heating the sample, deforming, and cooling the sample, or drawing the sample at a low temperature. The permanent shape is now stored while the sample shows the temporary shape. Heating the shape memory polymer above a transition temperature $T_{trans}$ induces the shape memory effect.

A chemically crosslinked network may be formed by low doses of irradiation. Polyethylene chains are oriented upon the application of mechanical stress above the melting temperature of polyethylene crystallites, which can be in the range between 60° C. and 134° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrochlorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made from stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

Figure 7:
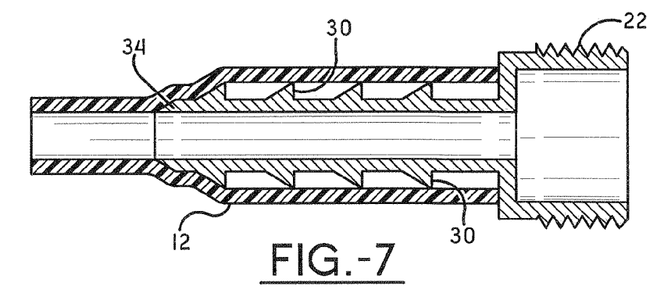
FIG. 7 is a side elevational view in cross-section illustrating a barbed metallic fitting inserted into a crosslinked tube.
Figure 8:
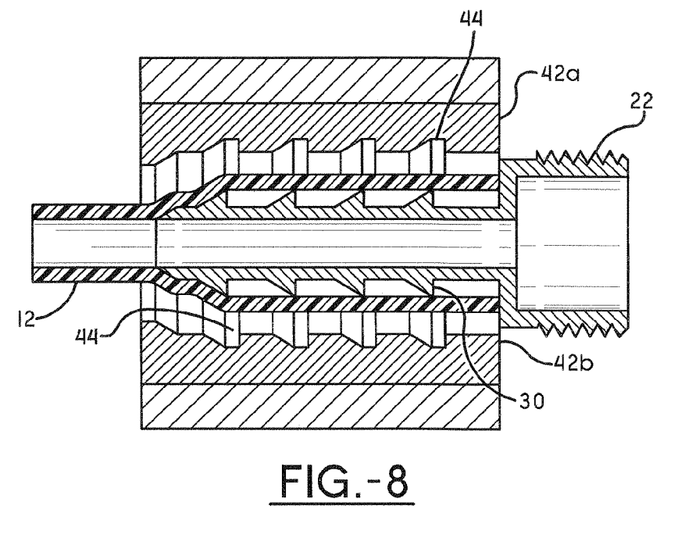
FIG. 8 is a side elevational view of FIG. 7 in cross-section illustrating the split heating blocks positioned about the crosslinked tube with inserted barbed fitting.
Figure 9:
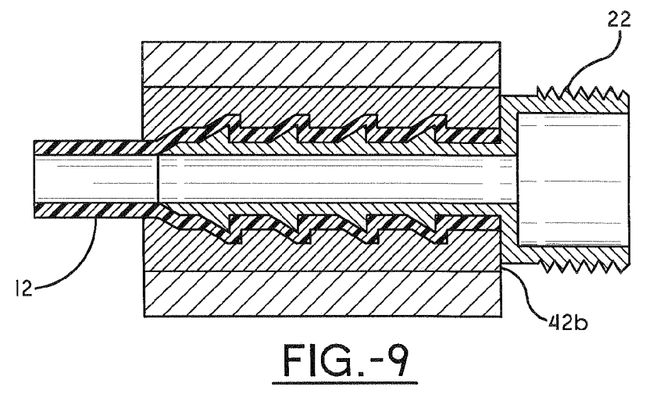
FIG. 9 is a side elevational view of FIG. 8 in cross-section after the split heating blocks have been closed.

FIGS. 7-9 are illustrative of one manner of employing shape memory characteristics of polymer tube 12 about barbed shaft 30 of a connector. FIG. 7 illustrates the insertion of beveled end 34 of the shaft into the I.D. of the tubing in a highly stylized manner. FIG. 8 illustrates the application of a split mold 42a, 42b with corresponding internal mold voids 44 which are positionable about protruding barbs 30 of the shaft of the connector. In this example as illustrated in FIG. 9, the application of heat induces the shape memory polymer to induce the shape memory effect by exceeding transition temperature $T_{trans}$.

As used in this application, crosslinking percentages which range from 20-98% are applicable, with a more preferred range being 40-90%, and most preferred from 65-89%.

While a threaded connector (internally threaded or externally threaded) is illustrated in the figures, this is not a requirement of the invention, although preferred for the water connection to a refrigeration device. For some applications, the geometry on the side of the connector which is opposite the barbed end, the geometry could be different, such as for example as appropriate to a "push-to-connect" fitting with zero threads.

While a barbed connector shaft is illustrated in this application, if the geometries of the tubing and the connector are appropriate, and sufficient frictional force is required to insert the connector into the fitting, no barbs may be necessary.

As used in this application, the requisite degree of I.D. tubing expansion by the inserted connector is between at least approximately 5% and 100% inclusive, the degree of expansion dependent upon various factors, including the wall thickness of the tube, the thicker the wall, the less I.D. expansion typically employed. The I.D. expansion is also related to wall thickness, and this percentage can range from at least approximately 20% to 150% inclusive, this percentage increases as wall thickness decreases. In a more preferred embodiment, the requisite degree of I.D. tubing expansion by the inserted connector will be increased by an amount which corresponds to a radial height of a barb, which typically ranges approximately an additional 5%, more preferably 10%, most preferably 15% in addition to the expansion achieved by fitting insertion. Of course it is recognized that if the inserted connector expands the I.D. of the tubing by a sufficient degree, and the amount of insertion is sufficient to impart a surface area which creates lateral forces in excess of any internal water pressure, i.e., $F_{(lateral\ retaining\ force)} > F_{(house\ water\ pressure)}$ then no barbs are necessary, although highly preferred. While house water pressure is the comparative useful for the disclosed application, in a more generic sense, the relationship must simply exist in comparison to the intended application.

While tubing 12 is preferably imparted with shape memory characteristics throughout the entire length of tubing used, there is no need to limit the invention to such. In fact, only the portion of the tubing into which shaft 32 of either connector 50a or connector 50b is required to have shape memory characteristics.

While tubing 12 is preferably circular, other profiles are envisioned to be within the scope of this invention, although circular I.D. profiles are most often encountered. The invention is additionally not limited to house water line connections to water distribution systems within refrigeration devices, but rather encompasses all manner of tubing connections, including any fluid (whether liquid or gaseous).

The best mode for carrying out the invention has been described for the purposes of illustrating the best mode known to the applicant at the time. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for securing a house water line to a water distribution system within a refrigeration device comprising the steps of:
- overmolding a polymeric attachment means onto a tube at or adjacent one end of said tube, a composition of said overmolded polymeric attachment means being at least partially chemically compatible with said tube;
- crosslinking at least a portion of said tube and said attachment means to set a permanent internal diameter of said tube and shape memory characteristics in said portion;
- inserting a shaft of a connector into said tube, an internal diameter (I.D.) of said tube being equal to or smaller than an outer diameter (O.D.) of said shaft; and
- applying an external or internal stimulus to at least said portion to contract said tube about said shaft.

2. The process of claim 1 wherein
said external stimulus is a temperature in excess of a transition temperature ($T_{trans}$).

3. The process of claim 1 wherein
said internal stimulus is time.

4. The process of claim 1 wherein said step of crosslinking said tube is between 40-90% crosslinking.

5. The process of claim 1 wherein
said shaft of said connector is metallic and further comprises raised retention means.

6. The process of claim 5 wherein
said shaft is selected from the group consisting of stainless steel and brass; and
said retention means is selected from the group of laterally-extending ribs and raised barbs.

* * * * *

UNITED STATES PATENT AND TRADEMARK OFFICE
CERTIFICATE OF CORRECTION

| | | |
|---|---|---|
| PATENT NO. | : 8,220,126 B1 | Page 1 of 1 |
| APPLICATION NO. | : 12/618296 | |
| DATED | : July 17, 2012 | |
| INVENTOR(S) | : Robert Yunk et al. | |

It is certified that error appears in the above-identified patent and that said Letters Patent is hereby corrected as shown below:

IN THE DETAILED DESCRIPTION OF THE DRAWINGS:

Column 3, line 4, "28" should read -- 2B --.

Column 3, line 8, "28" should read -- 2B --.

Column 3, line 47, "68" should read -- 6B --.

Signed and Sealed this
Fourth Day of September, 2012

David J. Kappos
*Director of the United States Patent and Trademark Office*